United States Patent [19]

Borchardt et al.

[11] Patent Number: 5,438,161
[45] Date of Patent: Aug. 1, 1995

[54] APPARATUS WITH INTERCONNECTION ARRANGEMENT

[75] Inventors: Glenn R. Borchardt, Franklin Park; Roy T. Swanson, La Grange Park; James W. Barker, Jr., Niles, all of Ill.

[73] Assignee: S&C Electric Company, Chicago, Ill.

[21] Appl. No.: 72,628

[22] Filed: Jun. 4, 1993

[51] Int. Cl.⁶ .................... H01L 23/28; H01B 5/00; H01B 5/08; B29C 37/00
[52] U.S. Cl. ................ 174/52.2; 174/126.1; 174/129 R; 174/96; 174/113 A; 324/127; 264/272.13; 336/96
[58] Field of Search ............ 174/DIG. 9, 52.2, 126.1, 174/129 R, DIG. 8, 88 C, 96, 113 A, 75 R

[56] References Cited

U.S. PATENT DOCUMENTS

| | | | |
|---|---|---|---|
| 2,935,719 | 5/1960 | Chase | 174/75 R |
| 3,114,825 | 12/1963 | Kilburn | 174/126.1 |
| 3,435,401 | 3/1969 | Epstein | 174/126.1 |
| 4,094,574 | 6/1978 | Gunn | 339/177 E |
| 4,590,672 | 5/1986 | Shimizu | 29/827 |
| 5,087,590 | 2/1992 | Fujimoto | 437/209 |
| 5,162,726 | 11/1992 | Swanson | 324/127 |

FOREIGN PATENT DOCUMENTS

| | | | |
|---|---|---|---|
| 961066 | 11/1949 | France | 174/129 R |
| 1150705 | 6/1963 | Germany | 174/126.1 |
| 4147636 | 5/1992 | Japan | 174/126.1 |

*Primary Examiner*—Leo P. Picard
*Assistant Examiner*—Stephen T. Ryan
*Attorney, Agent, or Firm*—James V. Lapacek

[57] ABSTRACT

An electrical path or interconnection arrangement is provided within a formed support body of polymeric material that exhibits volumetric changes during and after the forming thereof. The electrical path or interconnection arrangement provides an accurately positioned electrically conductive path through the material of the support body and also responds to, accommodates and alleviates the effects of forces at the interface between the material of the support body and the electrical path or interconnection arrangement that occur during and after the forming of the support body. The interconnection arrangement exhibits predetermined deformability/compressibility characteristics to alleviate stresses caused by the volumetric changes of the polymeric material. In a preferred arrangement, the interconnection arrangement includes an elongated tubular conductor fabricated from a metallic material. The material, the thickness of the tubular walls of the conductor, and the dimensions of the cross-section of the conductor are selected in accordance with the dimensions of the electrical path and the characteristics of the polymeric material to provide predetermined deformability/compressibility characteristics so as to avoid undesirable stress at the interface of the conductor and the polymeric material. In a specific embodiment, the interconnection arrangement also provides for the grading of the electrical field about a terminal conductor via the provision of a resilient member that is disposed about the terminal conductor and also connects one end of a conductor of the interconnection arrangement to the terminal conductor.

8 Claims, 3 Drawing Sheets

APPARATUS WITH INTERCONNECTION ARRANGEMENT

BACKGROUND OF THE INVENTION

1. Field of the Invention

The present invention relates generally to electrical apparatus such as sensors and transducers and more particularly to an interconnection arrangement for providing an electrical path within the material of a support body of the electrical apparatus, the interconnection arrangement including characteristics to alleviate stresses in the material of the support body due to volumetric changes in the material.

2. Description of the Related Art

Various electrical components (i.e., devices, elements, etc.) are molded within support bodies or housings to provide electrical apparatus such as current and/or voltage transducer. For example, see U.S. Pat. Nos. 5,162,726, 4,002,976, and 4,935,693. Commonly, such support bodies are molded using an elevated temperature-curing polymeric compound such as cycloaliphatic epoxy resin. Since the polymeric compound has a different coefficient of expansion versus temperature compared to the components molded within, as the polymeric compound of the support body cools and cures, forces are exerted on the various components with resultant stresses potentially occurring at various points of the interface between the components and the polymeric material. If such stresses and forces are not relieved, undesirable stress concentrations can result in the material of the support body with potentially deleterious effects. Thus, while it may be desirable to utilize relatively rigid (i.e., relatively non-deformable, incompressible) components to accurately position either the components themselves or other supported components, such configurations can create undesirable stresses in the material of the support body. On the other hand, if flexible (i.e., easily deformable, compressible) components are utilized, then the accurate positioning of components during the forming of the support body, within a mold for example, is either impossible, or greatly complicated and compromised. To alleviate these problems regarding the support and positioning of electrical components, a support arrangement is illustrated in U.S. Pat. No. 5,162,726 that responds to volumetric changes in the material of the support body by permitting relative movement between portions of the support arrangement.

While the prior art arrangements are useful to provide for the relief of certain stresses and forces in a molded support body, it would be desirable to provide additional and more economical electrical paths and interconnection arrangements within a molded support body that both accurately position the electrical path or interconnection arrangement and that relieve any stresses due to volumetric changes in the polymeric material of the support body.

SUMMARY OF THE INVENTION

Accordingly, it is a principal object of the present invention to provide an electrical path or interconnection arrangement within a formed support body of polymeric material while also providing for the accurate positioning of the electrical path or interconnection arrangement within the formed body.

It is another object of the present invention to provide an interconnection arrangement including provisions for the grading of the electrical field about a terminal conductor.

These and other objects of the present invention are efficiently achieved by the provision of an electrical path or interconnection arrangement within a formed support body of polymeric material that exhibits volumetric changes during and after the forming thereof. The arrangement is useful to provide an electrical path entirely or partially within the material of the support body; e.g., to interconnect components within the material of the support body, or to provide an electrical path through the material of the support body, or to provide an electrical path from a point on the exterior of the support body to a point within the material of the support body such as a connection to a component, etc.

The electrical path or interconnection arrangement provides an accurately positioned electrically conductive path through the material of the support body and also responds to, accommodates, and alleviates the effects of forces at the interface between the material of the support body and the electrical path or interconnection arrangement that occur during and after the forming of the support body. The interconnection arrangement exhibits predetermined deformability/compressibility characteristics to alleviate stresses caused by the volumetric changes of the polymeric material.

In a preferred arrangement, the interconnection arrangement includes an elongated tubular conductor fabricated from a metallic material. The material, the thickness of the tubular walls of the conductor, and the dimensions of the cross-section of the conductor are selected in accordance with the dimensions of the electrical path and the characteristics of the polymeric material to provide predetermined deformability/compressibility characteristics so as to avoid undesirable stress at the interface of the conductor and the polymeric material.

In a specific embodiment, the interconnection arrangement also provides for the grading of the electrical field about a terminal conductor via the provision of a resilient member that is disposed about the terminal conductor and also connects one end of a conductor of the interconnection arrangement to the terminal conductor.

BRIEF DESCRIPTION OF THE DRAWING

The invention, both as to its organization and method of operation, together with further objects and advantages thereof, will best be understood by reference to the specification taken in conjunction with the accompanying drawing in which.

DETAILED DESCRIPTION

Figure 1:
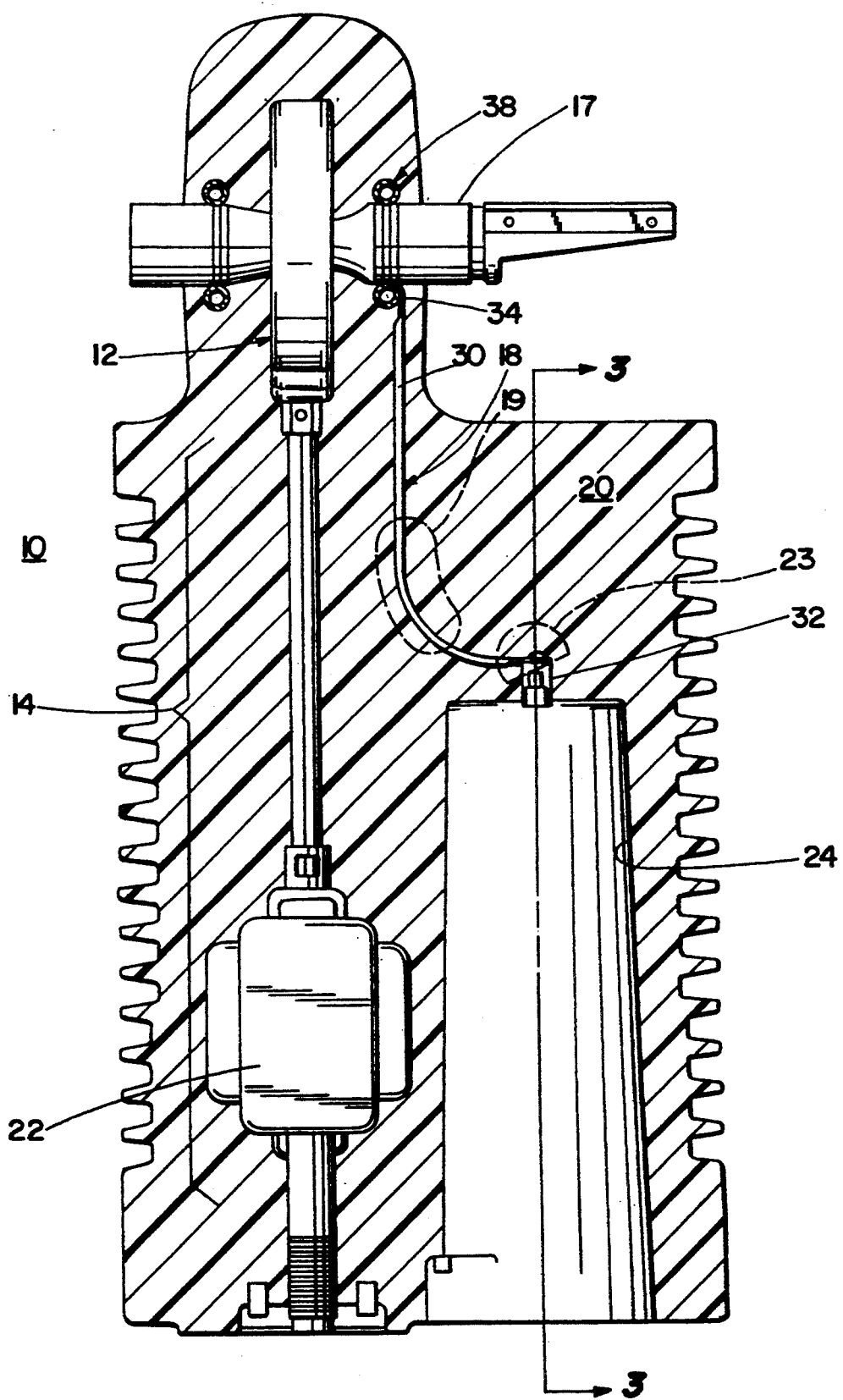
FIGS. 1 and 2 are respective front and left-side sectional views of apparatus illustrating the interconnection arrangement of the present invention.
Figures 2, 3:
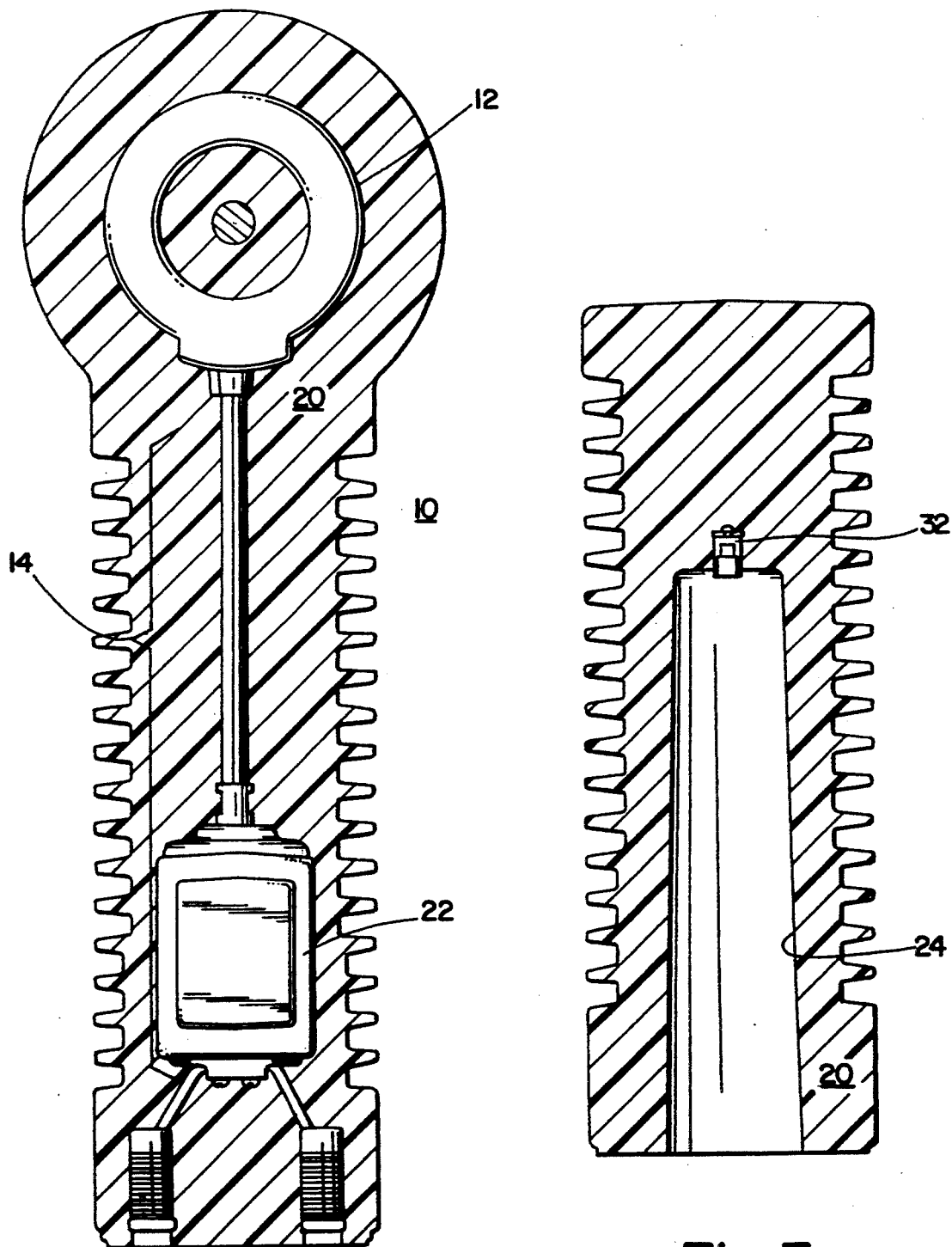
FIG. 3 is a sectional view taken along the line 3—3 of FIG. 1.
Figure 7:
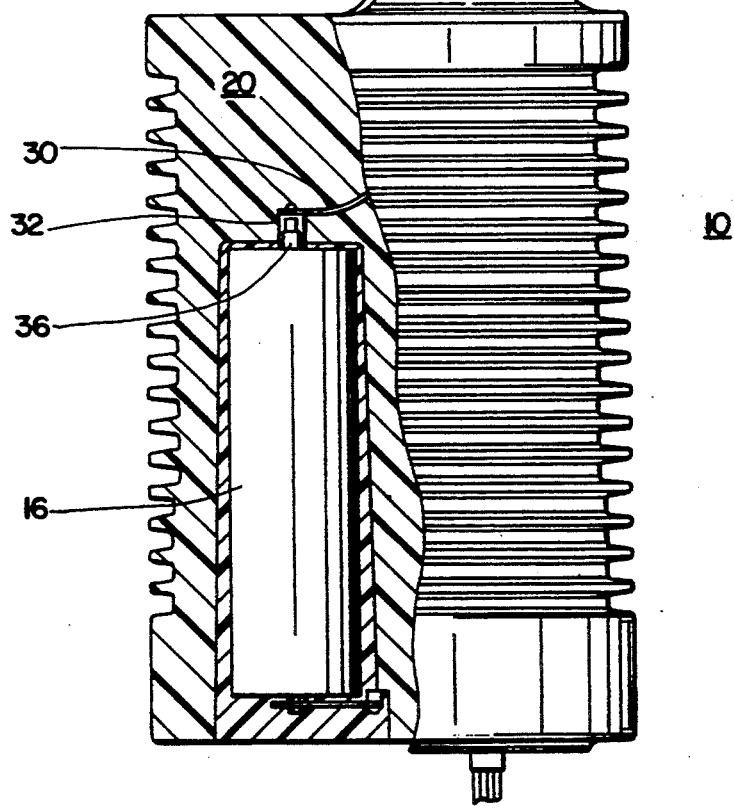
FIG. 7 is a rear elevational view, partly in section, of the apparatus of FIGS. 1 and 2 and additionally illustrating the incorporation of an additional electrical device that is connected to the interconnection arrangement of the present invention.

Referring now to FIGS. 1–3 and 7, apparatus 10 has an illustrative volumetric shape for specific application as an insulator and current/voltage sensor for an electrical power distribution switch or the like. The apparatus 10 includes a current-sensing transformer 12, a support arrangement 14 for the current-sensing transformer 12, a terminal conductor 17 that extends through the center of the current-sensing transformer 12, and an interconnection arrangement 18 all contained within a formed body 20. The support arrangement 14 includes a transformer assembly 22, which along with a capacitor 16 (FIG. 7) and the interconnection arrangement 18 provide a voltage sensor of the apparatus 10.

In a preferred embodiment, the components, except for the capacitor 16, are molded into the formed body 20 which is formed in a molding operation from an electrically insulating material such as epoxy resin. During the molding operation to provide the formed body 20, a receiving cavity 24 is formed. After the molding operation, the capacitor 16 (FIG. 7) is inserted into the receiving cavity 24, the capacitor 16 is connected to the interconnection arrangement 18 (as will be explained in more detail hereinafter), and the cavity 24 filled with a suitable potting compound to encapsulate the capacitor 16.

As is known to those skilled in the art, it is common and advantageous to use an elevated temperature-curing polymeric compound such as cycloaliphatic epoxy resin for the formed body 20. Since the polymeric compound has a different coefficient of expansion versus temperature compared to the electrical components, as the polymeric compound of the support body 20 cools and cures, shrinkage forces are exerted on the components and stresses can develop in the polymeric material of the formed body 20 at the interfaces with the components. For example, forces are exerted at the interface between the interconnection arrangement 18 and the material of the formed body 20 with the stress being particularly concentrated in the areas referred to generally at 19, 21, and 23.

In accordance with important aspects of the present invention, the interconnection arrangement 18, which may also be characterized as a conductor or an electrical path providing arrangement, provides the accurate positioning of the interconnection between the capacitor 16 and the terminal conductor 17 and also relieves stresses that may develop during and after the fabrication of the formed body 20. To accomplish this, the interconnection arrangement 18 exhibits predetermined deformability/compressibility characteristics. The term deformability/compressibility characteristics as used herein refers to the overall interconnection arrangement 18 being compressed in an overall volumetric sense while also being deformed as to its overall shape and as to certain structural features of the interconnection arrangement 18 as will be explained in more detail hereinafter. In a preferred arrangement, the interconnection arrangement 18 also exhibits resiliency/reversibility characteristics so that the interconnection arrangement returns generally to its previous shape and dimensions after a volumetric expansion of the material of the formed body 20 occurs. Of course, it should also be noted that the interconnection arrangement 18 must be relatively rigid and resistant to forces that tend to move it out of the defined path, at least to a degree sufficient to maintain the desired path during fabrication such as in a molding process.

Figure 4:
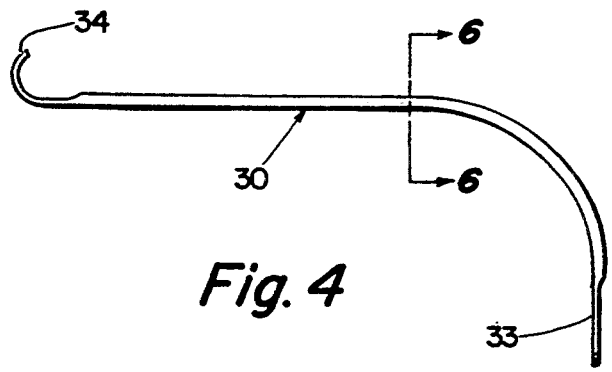
FIGS. 4 and 5 are respective front and right-side elevational views of a conductor of the interconnection arrangement of FIGS. 1 and 2.
Figure 5:
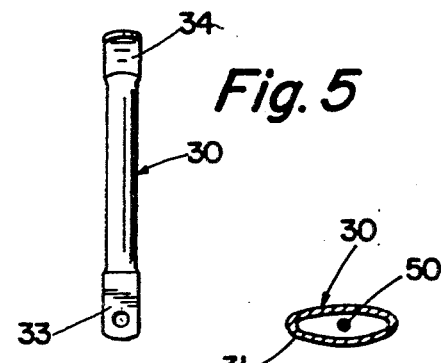
Figure 6:
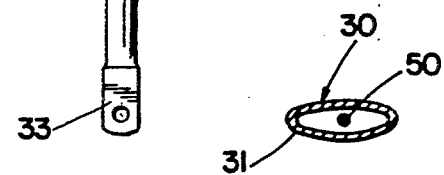
FIG. 6 is a sectional view taken along the line 6—6 of FIG. 4.

In a preferred embodiment, the interconnection arrangement 18 includes a conductor 30 having a tubular elongated shape as best seen in FIGS. 1 and 4–6. In a preferred embodiment, the conductor 30 is oval or flattened in cross-section (FIG. 6) as this provides for enhanced compressibility of the conductor 30 as well as the maximum clearance from other parts and boundary interfaces such as the exterior of the molded body 20. Of course, it should be understood that the cross-section of the conductor 30 can be round or other shapes where the desired compressibility is achieved and the clearance, i.e. distance or spacing dimension, to a boundary surface is not critical and space is available.

The conductor 30 is fabricated from a material that is conductive and also, as discussed hereinbefore, deformable/compressible to a predetermined degree as compared to the stresses to be relieved in the polymeric compound of the formed body 20 such that the forces developed will deform/compress the conductor 30 before any undesirable effects are caused in the formed body, i.e. sufficiently deformable/compressible to relieve the forces to the desired degree. In this regard, the compressibility characteristic is applicable to the overall conductor 30 from an external volumetric perspective regarding the volume of the conductor 30 within the formed body 20 while the tubular wall 31 of the conductor 30 is deformable with respect to the cross-section of the conductor 30, i.e. the compressibility of the conductor 30 being provided due to the space inside the tubular wall 31, which is filled with air in a preferred embodiment. Of course, it should be realized that in other specific embodiments, the space inside the tubular wall 31 is filled with other compressible materials.

As to the resiliency/reversibility characteristics of the interconnection arrangement 18, if volumetric expansion of the material of the formed support body 20 occurs, e.g. due to an elevation of temperature after fabrication and during use, the conductor 30 needs to respond at least to a sufficient degree to avoid undesirable stresses in the material and also to ensure that no voids are created with respect to the material interface. Accordingly, the overall conductor 30 as to an external perspective must return to an expanded state as to overall volume and the wall 31 must return from its previous degree of deformation to at least some extent.

Further, the material of the conductor 30, the thickness of the tubular walls 31, and the dimensions of the cross-section of the conductor 30 are selected in accordance with the dimensions of the electrical path and the characteristics of the polymeric material of the support body 20 to avoid undesirable stress at the interface of the conductor 30 and the polymeric material. As stated hereinbefore, the shape of the cross-section of the conductor 30 is also a factor that determines compressibility, e.g. the oval shape shown in FIG. 6 being more easily compressible than a round shape. For example, in a specific embodiment where the electrical path is approximately 5–7 inches, aluminum tubing is utilized for the conductor 30 having a wall thickness 31 of 0.022 inch and a diameter of 3/16 inch, before being formed to an oval shape. In order to avoid local stress effects at the interface between the material of the support body 20 and the conductor 30, the conductor 30 is coated with a mold-release agent before the forming of the support body 20.

The interconnection arrangement 18 also includes a terminal socket 32 (FIGS. 1 and 7) which is affixed to a first flattened end 33 of the conductor 30 by riveting or the like. The terminal socket 32 receives a contact 36 (FIG. 7) of the capacitor 16 for connection thereto. In a preferred arrangement, the other end 34 of the conductor 30 is flattened and formed with a radius of curvature such as an arch or loop, as shown.

In accordance with important aspects of the present invention, a garter spring 38, i.e. a coil spring in the shape of a torus, is positioned to encircle the terminal conductor 17, one garter spring 38 on either side of the current-sensing transformer 12. The garter springs 38 are conductive and alleviate the high electrical stresses that occur at the surface of the material of the formed body 20 adjacent the terminal conductor 17, i.e. at the interface therebetween, thus reducing corona effects. In effect, the embedded garter springs 38 serve to grade the electrical field resulting from the fabricated device configuration. The arch or loop at the end 34 of the conductor 30 is electrically connected to the terminal conductor 17, preferably via the garter spring 38 since it serves the dual purpose of grading the electrical field and providing the electrical connection of the conductor 30 to the terminal conductor 17.

While there have been illustrated and described various embodiments of the present invention, it will be apparent that various changes and modifications will occur to those skilled in the art. Thus, the present invention encompasses other specific implementations to achieve an interconnection arrangement that provides predetermined deformability/compressibility characteristics to absorb forces at the interface between the material of a formed body and the interconnection arrangement. For example, while a tubular metallic conductor 30 is perhaps the most economical implementation of the interconnection arrangement 18, the conductor 30 in other specific implementations is provided by a) tubular members fabricated from non-metallic conductive materials or b) non-conductive materials in the shape of the conductor 30 and additionally including an electrically conductive elongated member 50 (FIG. 6) within the tubular member 30. Accordingly, it is intended in the appended claims to cover all such changes and modifications that fall within the true spirit and scope of the present invention.

What is claimed and desired to be secured by Letters Patent of the United States is:

1. Apparatus comprising:
  insulating body means formed from a material that exhibits volumetric changes during and after forming; and
  first means having predetermined compressibility/deformability characteristics for providing an accurately positioned, elongated electrically conductive path within said material of said insulating body means and for responding to, accommodating, and alleviating the effects of forces at the interface between said material and said first means arising from the differences in volumetric expansion versus temperature between said material and said first means during and after the forming of said insulating body means, said first means comprising an elongated tubular conductor with a tubular wall that is deformed so as to compress said tubular conductor in response to volumetric changes in said material, said elongated tubular conductor having an oval cross-section with an overall maximum dimension d, at least a portion of said conductor along said path being a minimum distance D from the closest exterior point of said insulating body means, said distance D being at least several times greater than said dimensione d, said elongated tubular conductor having a predetermined deformability characteristic with respect to the overall elongated tubular conductor so as to be rigid enough to generally maintain said path and deformable enough to effectively relieve forces at said interface between said material and said first means whereby undesirable stress concentrations are avoided that could result in deleterious effects to said material of said insulating body.

2. Apparatus comprising:
  insulating body means formed from a material that exhibits volumetric changes during and after forming;
  a component disposed within said material of said insulating body means during the forming thereof; and
  second means for interconnecting a portion of said component and a predetermined point of said insulating body means, said second means providing an accurately positioned electrically conductive path within said insulating body means and responding to, accommodating, and alleviating the effects of forces on said second means occurring during and after the forming of said insulating body means, said second means comprising an elongated tubular member having an oval cross-section and an outer surface with predetermined compressibility characteristics over at least a portion of said outer surface said predetermined compressibility characteristics being defined in terms of the characteristics of said material and said outer surface being deformed to compress said elongated tubular member to provide said responding to, accommodating, and alleviating of the effect of forces, said elongated tubular member further comprising predetermined deformability characteristics so as to generally maintain said path during forming of said insulating body means while being deformable in response to forces whereby undesirable internal stress conditions within said insulating body means are avoided, for at least one point along said path said elongated tubular member being embedded within said material of said insulating body means a distance which is at least several times said cross-section of said elongated tubular member.

3. The apparatus of claim 2 wherein said elongated tubular member is fabricated from aluminum.

4. The apparatus of claim 2 wherein said predetermined compressibility characteristics entail suitable deformation and compression to absorb predetermined forces which result from volumetric changes in said material.

5. The apparatus of claim 4 wherein said second means further comprises predetermined resilient characteristics.

6. The apparatus of claim 2 further comprising third means affixed to said insulating body means, said third means comprising electrical connection means at said predetermined point of said insulating body means cooperating with said interconnection means to electrically connect said third means to said component.

7. The apparatus of claim 2 wherein said elongated member and said component are conductive and said second means further comprises connection means for electrically connecting and affixing said elongated member to said component.

8. Apparatus comprising:
   insulating body means formed from a material that exhibits volumetric changes during and after forming;
   a device disposed within said material of said insulating body means during the forming thereof; and
   second means for providing an electrically conductive path between a portion of said device and a predetermined point of said insulating body means, said second means comprising means having predetermined characteristics for relieving stresses at the interface between said material and said second means resulting from the volumetric changes in said material that occur during and after the forming of said insulating body means, said second means comprising an elongated tubular member having an oval cross-section and overall predetermined deformability characteristics and an outer surface with predetermined compressibility characteristics defined in terms of the characteristics of said material to provide for said relieving of stresses at said interface between said material and said second means, said predetermined deformability characteristics being defined such that said elongated tubular member generally maintains the shape of said path during forming of said insulating body means while being deformed in response to forces whereby undesirable internal stress conditions within said insulating body means are avoided, for at least one portion of said path said tubular member being embedded within said material of said insulating body means a distance that is at least several times the expanse of said cross-section of said tubular member.

* * * * *